United States Patent [19]

Enomoto et al.

[11] Patent Number: 5,659,877
[45] Date of Patent: Aug. 19, 1997

[54] SYSTEM FOR DISTRIBUTING BROADCASTING MATERIAL AND IDENTIFYING SEGMENT DATA

[75] Inventors: Mitsutaka Enomoto; Mamoru Ishiguro, both of Kanagawa; Masato Yokota, Tokyo; Shingo Yamauchi, Kanagawa, all of Japan

[73] Assignee: Sony Corporation, Japan

[21] Appl. No.: 367,759

[22] Filed: Jan. 3, 1995

Related U.S. Application Data

[63] Continuation of Ser. No. 672,686, Mar. 20, 1991, abandoned.

[30] Foreign Application Priority Data

Mar. 28, 1990 [JP] Japan ................................. 2-079922

[51] Int. Cl.$^6$ ........................................................ H04H 1/00
[52] U.S. Cl. .......................... 455/4.1; 455/507; 348/722; 370/312
[58] Field of Search ................. 455/4.1, 4.2, 3.1, 455/6.1, 6.2, 3.2, 18, 53.1; 348/7, 4, 8

[56] References Cited

U.S. PATENT DOCUMENTS

| | | | |
|---|---|---|---|
| 3,746,780 | 7/1973 | Stetten et al. | 358/86 |
| 4,450,477 | 5/1984 | Lovett | 348/12 |
| 4,567,512 | 1/1986 | Abraham | 455/4.2 |
| 4,605,973 | 8/1986 | Von Kohorn | 358/86 |
| 4,625,235 | 11/1986 | Watson | 455/12 |
| 4,734,764 | 3/1988 | Pocock et al. | 348/7 |
| 4,891,703 | 1/1990 | Noudan | 358/142 |
| 4,894,789 | 1/1990 | Yee | 348/10 |
| 5,099,319 | 3/1992 | Esch et al. | 358/86 |
| 5,151,782 | 9/1992 | Ferraro | 455/4.1 |
| 5,285,272 | 2/1994 | Bradley et al. | 455/4.1 |
| 5,345,594 | 9/1994 | Tsuda | 455/18 |
| 5,424,770 | 6/1995 | Schmeczer et al. | 348/705 |

FOREIGN PATENT DOCUMENTS 8606050 10/1986 WIPO ...................... 414/273

OTHER PUBLICATIONS

Chiddix, "Video Cassette Banks Automate Delayed Satelite Programming", Aug. 1978.
Rice, "Implementing a commercial insertion system", received in PTO Feb. 21, 1988.
"7609 Sat–R–Dat Decoder/Controller" Advertisement.

Primary Examiner—Edward F. Urban
Attorney, Agent, or Firm—Ronald P. Kananen

[57] ABSTRACT

A system for distributing broadcasting material a source station transmits a material signal representing a series of broadcasting material segments, together with a segment data signal containing segment data, such as the absolute start frame number of each segment and the number of frames in each segment. Each of a number of branch stations receives the transmitted material segments and the segment data signal, records the broadcasting material segments, and then files away the broadcasting material segments, for example in a cart machine, in accordance with the received segment data. The transmission may be by way of an artificial satellite, and it is unnecessary for the transmission from the satellite to the branch stations to be synchronised with the transmission from the source station to the satellite.

29 Claims, 5 Drawing Sheets

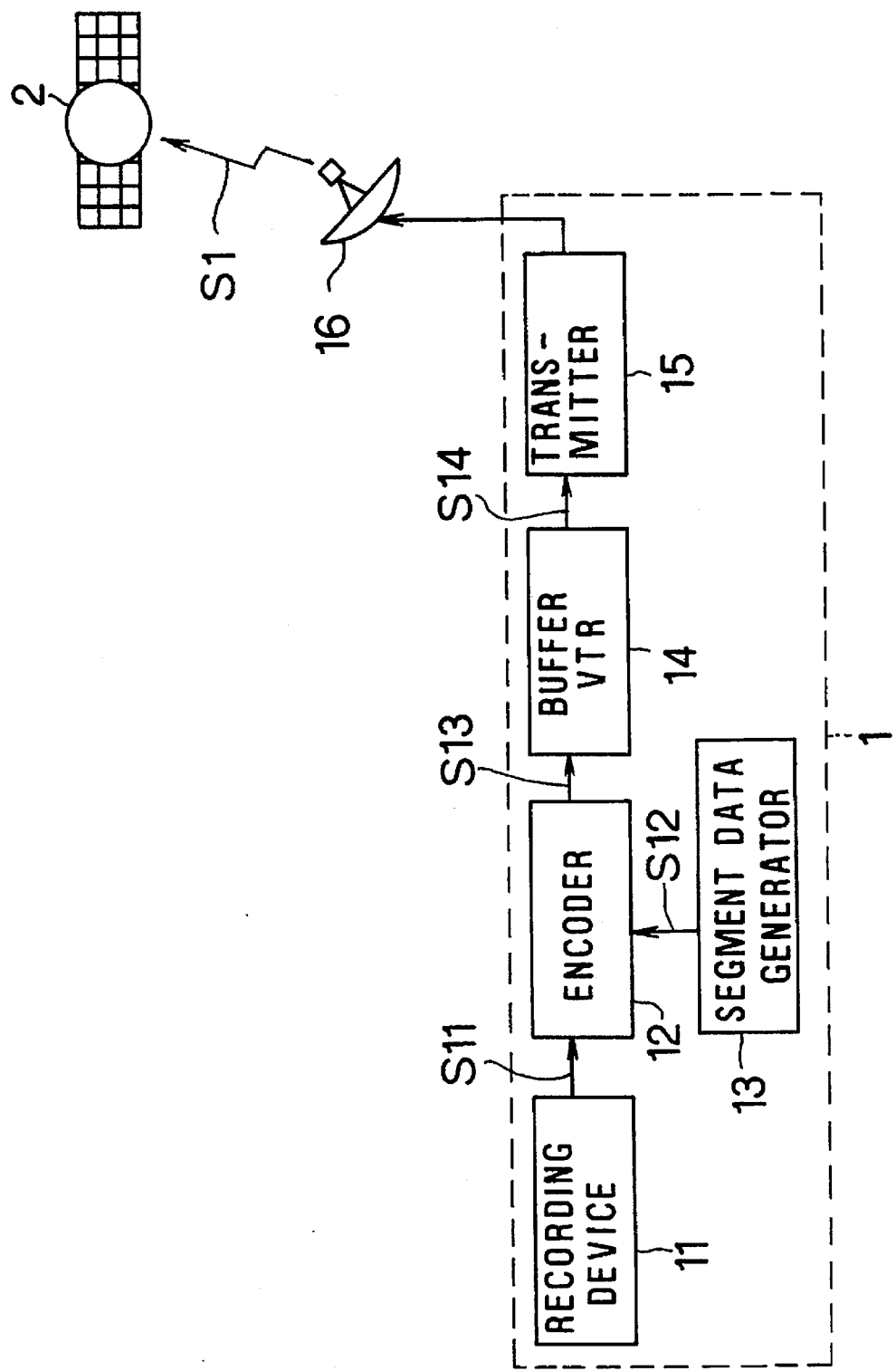

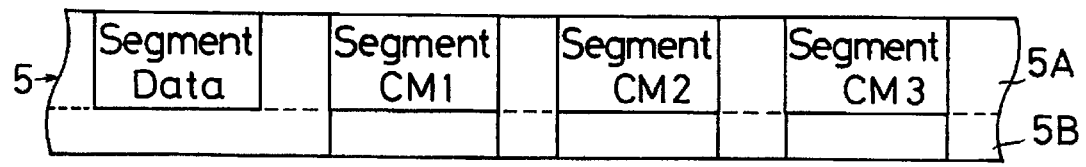
FIG. 2
| Segment ID | Start Frame | No. of Frames |
|---|---|---|
| CM 1 | SOM 1 | DUR 1 |
| CM 2 | SOM 2 | DUR 2 |
| CM 3 | SOM 3 | DUR 3 |
| ⋮ | ⋮ | ⋮ |
FIG. 3
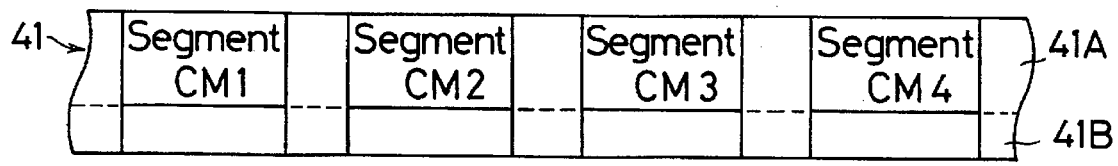
FIG. 5

SYSTEM FOR DISTRIBUTING BROADCASTING MATERIAL AND IDENTIFYING SEGMENT DATA

This application is a continuation of application Ser. No. 07/672,686 filed Mar. 20, 1991, now abandoned.

BACKGROUND OF THE INVENTION

1. Field of the Invention

This invention relates to a system for distributing broadcasting material, such as program material and advertising commercial material, from a source station to at least one branch station, and to such a source station per se and such a branch station per se.

2. Description of the Prior Art

In a television broadcasting network, there is a need to be able to distribute broadcasting material, which is produced and edited in a central source station, from the source station to one, and more usually a multiplicity of, branch stations, so that the same material can be broadcast simultaneously over a large area. The material to be distributed will usually contain a series of commercial material segments, a series of program material segments, or a mixture. Obviously, one possible method of distributing the material would be to transport video cassettes containing the broadcasting material segments, for example by mail or courier. However, it will be appreciated that this would be slow and expensive. Another possible method of distribution is to transmit a series of broadcasting material segments via a space satellite to the branch broadcasting stations. This has the advantage of almost instantaneous distribution, and although satellite time may be expensive, the series of broadcasting material segments may be distributed during off-peak periods. A disadvantage of a simple distribution method of this type is that, at each branch station, it is necessary for an operator to determine the beginning and end of each broadcasting material segment in the series before copying the broadcasting material segment to individual video cassettes which are filed away and which can then be retrieved and broadcast in a desired order. This is a time consuming operation. In order to overcome this problem, it may be considered expedient to synchronise the transmitting operation at the central broadcasting station with the receiving and filing operations at the branch stations. However, a problem arises when using distribution via space satellites, in that space satellites are usually designed to use their own clock signals to control their re-transmission operations. Therefore, although the central and branch broadcasting stations can be synchronised, and the central broadcasting station can transmit the broadcasting material segments to the satellite at desired times, the re-transmission by the satellite to the branch stations will not be synchronised.

SUMMARY OF THE INVENTION

One object of the present invention is to provide a system for distributing a series of broadcasting material segments between a source station and at least one branch station, which does not require operator intervention in order to determine the beginning and ending of each segment in the material received at the branch station, and which is not susceptible to problems which may be caused by different clock systems being used in the transmission from the source station to the or each branch station.

In accordance with one aspect of the present invention there is provided a system for distributing broadcasting material, comprising a source station comprising transmitting means for transmitting a material signal representing a series of broadcasting material segments and for supplying a segment data signal containing segment data related to the segments in the series, and at least one branch station, each branch station comprising receiving means for receiving the transmitted material signal and the supply data signal, recording means for recording the material signal, and filing means for filing the broadcasting material segments recorded by the recording means in accordance with the segment data contained in the segment data signal.

Because the segment data is supplied to each branch station, each branch station can file the broadcasting material segments in accordance with the segment data, without the branch station needing to be synchronised with the source station or with any other apparatus, such as a satellite, used in the transmission process.

For example, in one embodiment, the segment data signal contains an identity code of each material segment in the series and timing data representing the timing of each material segment in the series, for example by way of the absolute frame numbers or time codes of the frames of each material segment in the series. For example, the absolute start frame number and the number of frames in the material segment may be specified. Alternatively, the start frame number and the end frame number of each material segment in the series may be specified.

Other objects of the present invention are to provide a source station and a branch station, respectively, for use in a system as mentioned above.

Other objects, features and advantages of the present invention will become apparent upon consideration of the following detailed description of a preferred embodiment thereof, especially when considered with the accompanying drawings in which like reference numerals are employed to designate the same or similar components in the different figures.

BRIEF DESCRIPTION OF THE DRAWINGS

FIG. 2 is a schematic illustration of a video tape produced in a central station and in a branch station of the system of FIG. 1;

FIG. 3 is a table showing segment data which is transmitted between the central station and the branch station in FIG. 1;

FIG. 5 is a schematic illustration of a video tape produced in a central station and a branch station of the system of FIG. 4.

DETAILED DESCRIPTION OF THE PREFERRED EMBODIMENT

Preferred embodiments of the present invention will now be described with reference to the accompanying drawings, initially with reference to FIGS. 1 to 3.

Figure 1B:
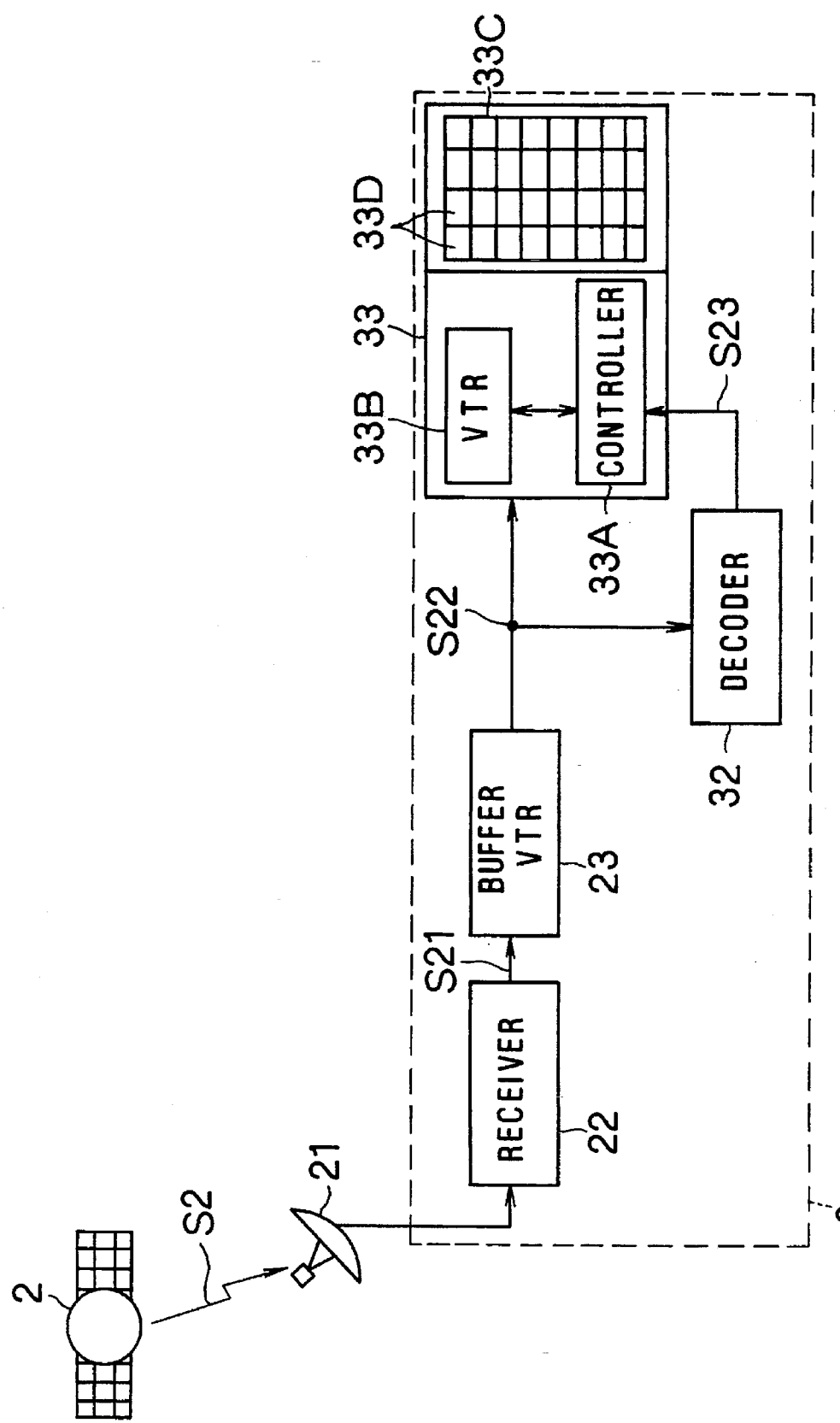
FIG. 1 (parts A and B) is a block diagram of a first embodiment of broadcasting material distribution system according to the present invention.

As shown generally in FIG. 1, a central broadcasting station 1 transmits a signal S1 to a space satellite 2, which converts the signal into a signal S2, which is transmitted to a plurality of branch stations 3, only one of which is shown in FIG. 1.

In the central broadcasting station 1, segments of broadcasting material, for example different advertising commercials, produced by apparatus generally designated as recording device 11, are provided as a signal S11 to an encoder 12. In the encoder 12, the commercial material signal S11 is combined with a segment data signal S12 generated by a segment data generator 13 to form a composite encoded signal S13 which is recorded by a buffer video tape recorder (VTR) 14.

The signal S11 provided by the apparatus 11 contains video signals and audio signals for commercials CM1, CM2, CM3 . . . , which are recorded on the video track 5A and the audio track 5B of the video tape in the buffer VTR 14, as shown in FIG. 2. The segment data generator 13 produces segment data as shown in FIG. 3 including an identification of each segment, for example "CM1", "CM2", "CM3" . . . , the start position of each segment on the video tape, SOM1, SOM2, SOM3 . . . , and the length of each commercial segment on the video tape, DUR1, DUR2, DUR3 . . . The start positions SOMx may be in terms of the absolute frame numbers or time codes of the first frames of the respective commercial segments on the video tape, or may be the start times of the commercial segments on the video tape in relation to the clocking system of the broadcasting station 1. Similarly, the length data DURx may be in terms of the number of frames/time codes in the respective segment, or in terms of the duration of the respective segment with respect to the clocking system of the central broadcasting station 1.

In the encoder 12, the segment data, as shown in FIG. 3, is digitally-encoded and is recorded by the buffer VTR 14 during the vertical blanking period of the video signal on the video track 5A, for example at the beginning of the video tape 5. Thus, the recording on the video tape 5 is as represented in FIG. 2, and comprises the encoded segment data, followed by the commercial segments each beginning on the tape at the position designated by the segment data and each having a duration as designated by the segment data.

Although, as described above, the duration of each commercial segment is included in the segment data recorded on the video tape 5, as an alternative, the absolute number of the last frame of each segment may be recorded, or the time of the last frame of each segment.

In the central broadcasting station, at an instant scheduled in advance (and controlled by the same clock signal in the central broadcasting station 1 and each branch broadcasting station 3) the video tape 5 is played back by the buffer VTR 14, and the resultant signal S14 is transmitted by a satellite signal transmitter 15 and an antenna 16 as the broadcasting material signal S1 to the space satellite 2. Also, in each branch broadcasting station 3, at the scheduled time instant, the signal S2 from the satellite 2 is received by an antenna 21 and a satellite signal receiver 22, and the received signal S21 is recorded by a buffer video tape recorder 23. Thus, the recording on the buffer VTR 23 in each branch broadcasting station 3 will be identical to the recording illustrated in FIG. 2 on the buffer VTR 14 in the central broadcasting station 1.

After the recording has been made on the buffer VTR 23 in each branch broadcasting station 3, the video tape on each buffer VTR 23 is played back, and the output signal S22 of the buffer VTR 23 is applied to a decoder 32 and to a cart machine (or video cassette "juke-box") 33. The decoder 32 decodes the segment data at the beginning of the video tape recording in order to determine the identities "CM1", "CM2", "CM3" . . . of the segments, and the respective start frame numbers SOM1, SOM2, SOM3 . . . and segment lengths DUR1, DUR2, DUR3 . . . , and this decoded data is supplied as a signal S23 to a controller 33A of the cart machine 33. The cart machine 33 also includes a video tape recorder 33B, and a store 33C for a plurality of video tape cassettes 33D which can be loaded under control of the controller 33A into the VTR 33B. In accordance with the segment data for each commercial segment, that is to say the identification, the start frame number and the length, the cart machine loads a respective cassette 33D into the VTR 33B, and the appropriate commercial material segment on the output S22 from the VTR 23 is recorded on the selected video cassette 33D. This procedure repeats until all of the commercial material segments reproduced by the buffer VTR 23 have each been appropriately recorded from start to finish on the desired video cassettes. Once all of the commercial material segments have been recorded, they are therefore filed away in the cart machine 33.

It will be appreciated from the above that the commercial material segments can be properly filed away in the cart machine 33 in accordance with the segment data included in the transmission from the central broadcasting station 1 to each branch broadcasting station 3, irrespective of any clocking differences between the satellite 2 on the one hand, and the central and branch broadcasting stations 1, 3 on the other hand. Thus, the commercial material segments can be positively and reliably distributed.

Figure 4A:
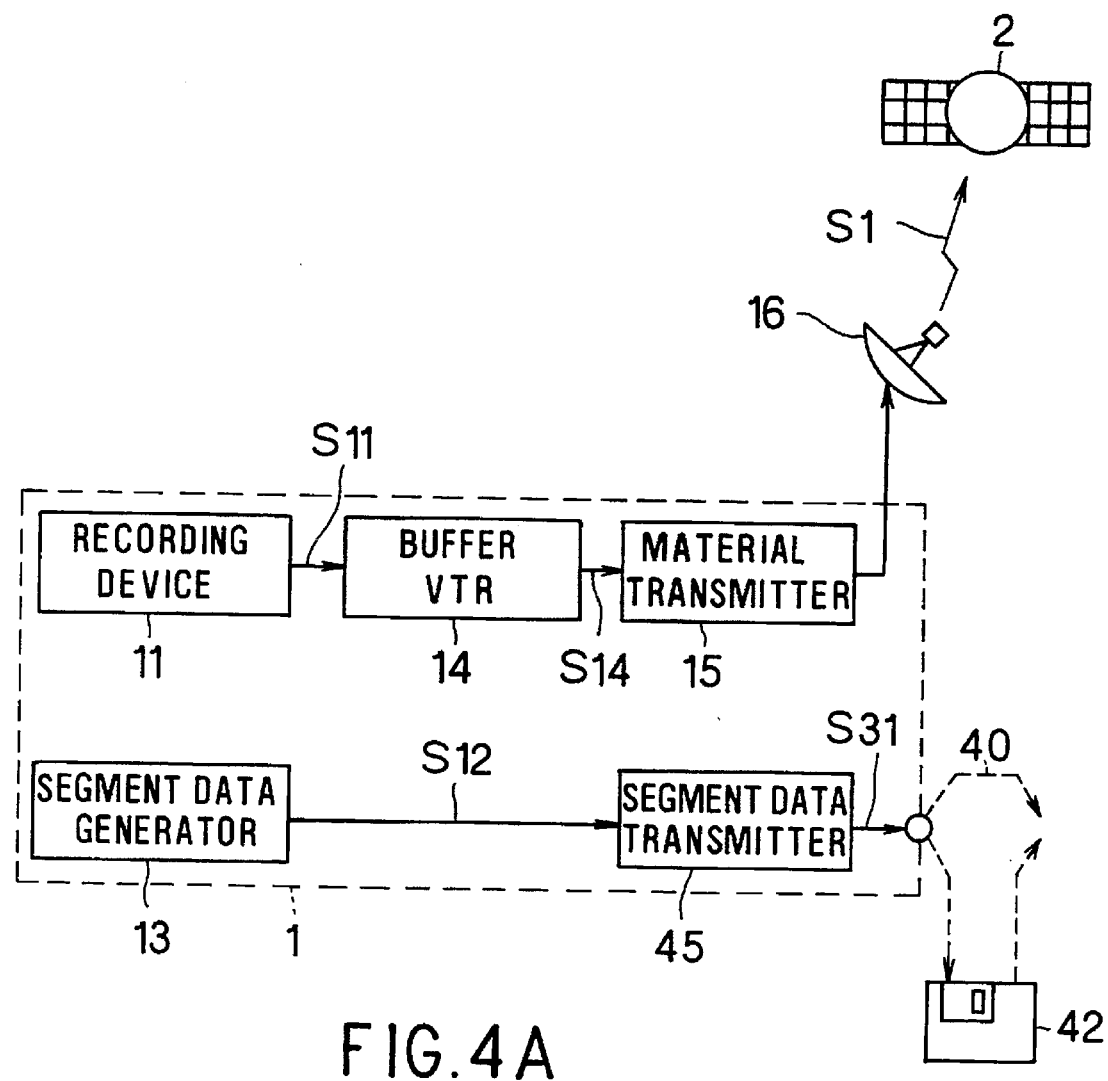
FIG. 4 (parts A and B) is a block diagram of a second embodiment of broadcasting material distribution system according to the present invention.
Figure 4B:
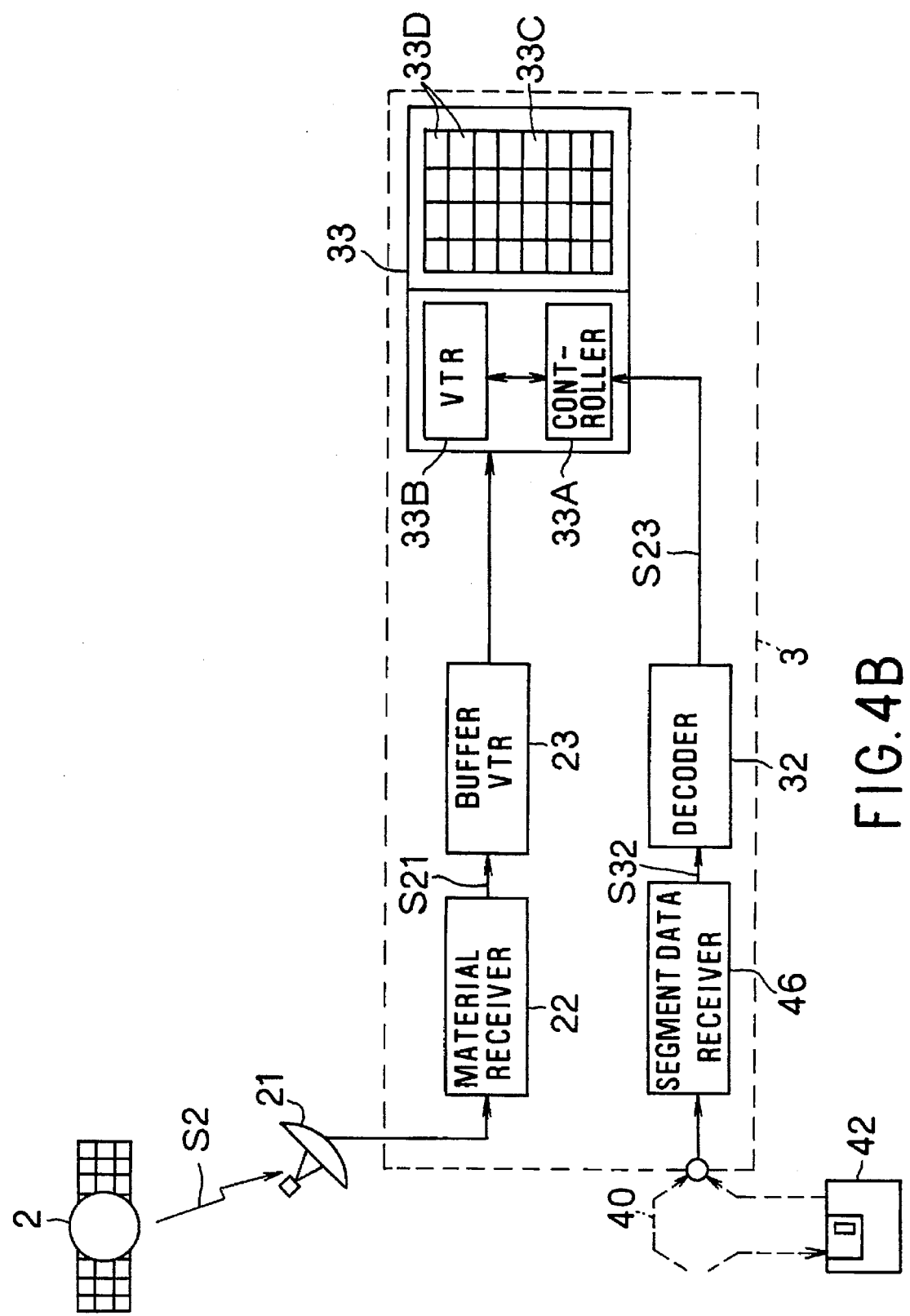

A second embodiment of the present invention will now be described with reference to FIGS. 4 and 5, in which those components which have been previously described with reference to FIGS. 1 to 3 are designated by the same reference numerals.

The main difference between the first and second embodiments is that, in the second embodiment, the segment data is transmitted from the central broadcasting station 1 to the branch broadcasting stations 3 separately from the commercial material segments, for example by way of a land line 40, such as a telephone line, or by way of floppy disks 42 which are transported from the central broadcasting station 1 to the branch broadcasting stations 3.

Therefore, in the central broadcasting station 1, the commercial material signal S11 is directly recorded by the buffer VTR 14, so that the video tape 41 (see FIG. 5) produced thereby does not have any segment data at the beginning of the recording. At the scheduled transmission instant, the video tape 41 is played back by the buffer VTR, so that only the video signals on the video track 41A and audio signals on the audio track 41B forming the commercial material segments CM1, CM2, CM3 . . . are transmitted as the broadcasting material signal S1 to the space satellite 2, and therefore only the commercial material segments CM1, CM2, CM3 . . . are recorded by the buffer VTR 23 in each branch broadcasting station 3. In the central broadcasting station 1, the segment data, as shown in FIG. 3, produced by the segment data generator 13 as signal S12 is transmitted by a transmitter 45 over the land line 40 as signal S31 to a segment data receiver 46 in each branch broadcasting station 3. This transmission of the segment data may be made at the same time as the satellite transmission of the commercial material, or at some other time. Alternatively, the segment data transmitter 45 may comprise a floppy disk drive which records the segment data on floppy disks 42 which are then transported to the branch broadcasting stations 3, and in this case the segment data receiver 46 in each branch broadcasting station may comprise a floppy disk drive which reads the segment data from the respective floppy disk 42.

The received segment data is supplied as a signal S32 to a decoder 32 which produces a decoded signal S23 to the controller 33A of the cart machine 33 in a similar way to that described above with reference to the first embodiment. The remaining operation of the branch broadcasting stations 3 in the second embodiment is similar to that described above with reference to the first embodiment.

It will be appreciated that many modifications and developments may be made to the embodiments described above. For example, reference has been made to tape cassettes and video tape recorders for recording and reproducing the broadcasting material, but any other suitable form of recording and reproducing apparatus may be employed. Also, the embodiments have been described with reference to commercial broadcasting material segments, but the system and apparatus may be used for distributing other material. Furthermore, in the first and second embodiments, the transmission material signal S42 is formed by recording the required material segments in the buffer VTR 14 and then playing back the recording on the buffer VTR 14. However, as an alternative, the signal S14 may be produced by a cart machine at the central broadcasting station 1 which plays back the commercial material segments from cassettes stored in the cart machine at the required times during transmission to the satellite in order to form the signals S14 and S1.

Having described the preferred embodiments of the invention with reference to the accompanying drawings, it is to be understood that the invention is not limited to the precise embodiments and that various changes and modification thereof may be effected by one skilled in the art without departing from the spirit or scope of the invention as claimed.

What is claimed is:

1. A system for distributing broadcasting material, comprising:
    a source station comprising transmitting means for transmitting a composite signal having a series of broadcasting material segments preceded by a segment data signal, said segment data signal containing segment data representing the position and length of each of said broadcasting material segments in the series; and
    a plurality of branch stations, each said branch station comprising receiving means for receiving the transmitted composite signal with the supplied segment data signal, recording means for recording the broadcasting material segments on a recording medium, and filing means for filing each of the broadcasting material segments recorded by the recording means on said recording medium at a location specified by the segment data contained in the segment data signal, said broadcasting material segments to be rebroadcast simultaneously by said plurality of branch stations.

2. A system according to claim 1, wherein:
    the transmitting means comprises an encoder for generating said composite signal from the broadcasting material segments and the segment data signal, and means for transmitting the composite signal; and
    each said receiving means comprises a decoder for decoding the segment data signal from the composite signal.

3. A system according to claim 2, wherein said transmitting means is adapted to transmit the composite signal to each said branch station via an artificial satellite.

4. A system as set forth in claim 3, wherein a transmission from said source station to said satellite is not synchronized with a transmission from said satellite to each said branch station.

5. A system according to claim 1, wherein:
    said transmitting means has a first channel for transmitting the broadcasting material segments and a second channel for supplying the segment data signal separately from the broadcasting material segments; and
    each said receiving means has a first reception channel for receiving the broadcasting material segments and a second reception channel for receiving the segment data signal.

6. A system according to claim 5, wherein said first channel transmits the broadcasting material segments to each said branch station via an artificial satellite.

7. A system according to claim 5 or 6, wherein said second channel supplies the segment data signal to each said branch station via a land line.

8. A system according to claim 5 or 6, wherein said second channel supplies the segment data signal to each said branch station via a recording medium transportable between the source station and that branch station.

9. A system according to claim 1, wherein the segment data signal contains an identity code for each broadcasting material segment in the series and timing data representing the timing of each broadcasting material segment in the series.

10. A system according to claim 9, wherein the timing data represents a frame number for each broadcasting material segment in the series.

11. A system according to claim 1, wherein said source station further comprises means for recording at least the broadcasting material segments to be transmitted and for reproducing the recorded broadcasting material segments for transmission by said transmitting means.

12. A system according to claim 1, wherein the recording means of each said branch station comprises a buffer video tape recorder.

13. A system according to claim 1, wherein said filing means of each said branch station comprises a video cassette recorder for recording at respective times onto respective video cassettes said broadcasting material segments recorded by said recording means, and an apparatus for storing said plurality of video cassettes with each said respective broadcasting material segment thereon and for loading selected ones of said cassettes into said video cassette recorder, said respective times and said respective video cassettes being specified by said segment data signal.

14. A branch station according to claim 1, wherein said recording means comprises a buffer video tape recorder.

15. A system as set forth in claim 1, wherein said broadcasting material segments are filed at a plurality of locations with each said location being specified by said segment data signal.

16. A branch station for a broadcasting material distribution system having a central source station and a plurality of branch stations, each said branch station comprising:
    receiving means for receiving a composite signal having a series of broadcasting material segments preceded by a segment data signal, said segment data signal containing segment data specifying the position of each of said broadcasting material segments in said series and a length of each of said broadcasting material segments in said series;
    recording means for recording the received broadcasting material segments on a recording medium; and
    filing means for separately filing each of the broadcasting material segments recorded by the recording means on said recording medium at a location specified by the segment data contained in the segment data signal, said broadcasting material segments to be rebroadcast simultaneously by said plurality of branch stations.

17. A branch station according to claim 16, wherein:

the broadcasting material segments and the segment data signal are received as a composite signal; and said receiving means comprises a decoder for decoding the segment data signal from the composite signal.

18. A branch station according to claim 16, wherein said receiving means receives said composite signal from an artificial satellite.

19. A branch station as set forth in claim 18, wherein a transmission from said satellite to said branch station is not synchronized with a transmission from said central source station to said satellite.

20. A branch station according to claim 16, wherein said receiving means has a first channel for receiving the broadcasting material segments and a second channel for receiving the segment data signal.

21. A branch station according to claim 20, wherein said first channel receives the broadcasting material segments from an artificial satellite.

22. A branch station according to claim 20 or 21, wherein said second channel receives the segment data signal on a land line.

23. A branch station according to claim 20 or 21, wherein said second channel receives the segment data signal on a transportable recording medium.

24. A branch station according to claim 16, wherein the segment data signal contains an identity code for each broadcasting material segment in the series and timing data representing the timing of each broadcasting material segment in the series.

25. A branch station according to claim 24, wherein the timing data represents a frame number for each broadcasting material segment in the series.

26. A branch station according to claim 16, wherein said filing means comprises a video cassette recorder for recording at respective times onto respective video cassettes said broadcasting material segments recorded by said recording means, and an apparatus for storing said plurality of video cassettes with each said respective broadcasting material segment thereon and for loading selected ones of said cassettes into said video cassette recorder said respective times and said respective video cassettes being specified by said segment data signal.

27. A branch station as set forth in claim 16, wherein said filing means files said broadcasting material segments at a plurality of locations with each said location being specified by said segment data signal.

28. A central source station for use in a broadcasting material distribution system having a plurality of rebroadcasting branch stations, said central source station comprising transmitting means for transmitting a composite signal, having a series of broadcasting material segments and a segment data signal inserted into a vertical blanking period of said broadcasting material segments, to said plurality of rebroadcasting branch stations, said segment data signal containing segment data for identifying each broadcasting material segment in the series and a length of each broadcasting material segment in the series;

wherein said segment data signal also comprises data which identifies locations in a recording medium at said rebroadcasting branch stations, said rebroadcasting branch stations having means for recording said broadcasting material segments at said locations in said recording medium.

29. A branch station for a broadcasting material distribution system having a central source station and a plurality of branch stations, each said branch station comprising:

a receiver for receiving a composite signal having a segment data signal and a plurality of broadcasting material segments, said segment data signal specifying a position of each broadcasting material segment and a length of each broadcasting material segment and said broadcasting material segments being comprised of video signals and audio signals;

a decoder for receiving said composite signal and for separating said segment data signal from said broadcasting material segments;

a controller for receiving said segment data signal from said decoder; and a recorder for recording said broadcasting material segments on a recording medium at locations specified by said controller in accordance with said segment data signal;

wherein said branch station rebroadcasts said broadcasting material segments simultaneously with other branch stations.

\* \* \* \* \*